Feb. 21, 1967  H. KROCHTA  3,304,695
HORIZONTALLY DISPOSED CENTRIFUGAL GAS SCRUBBER
Filed March 29, 1965  3 Sheets-Sheet 1
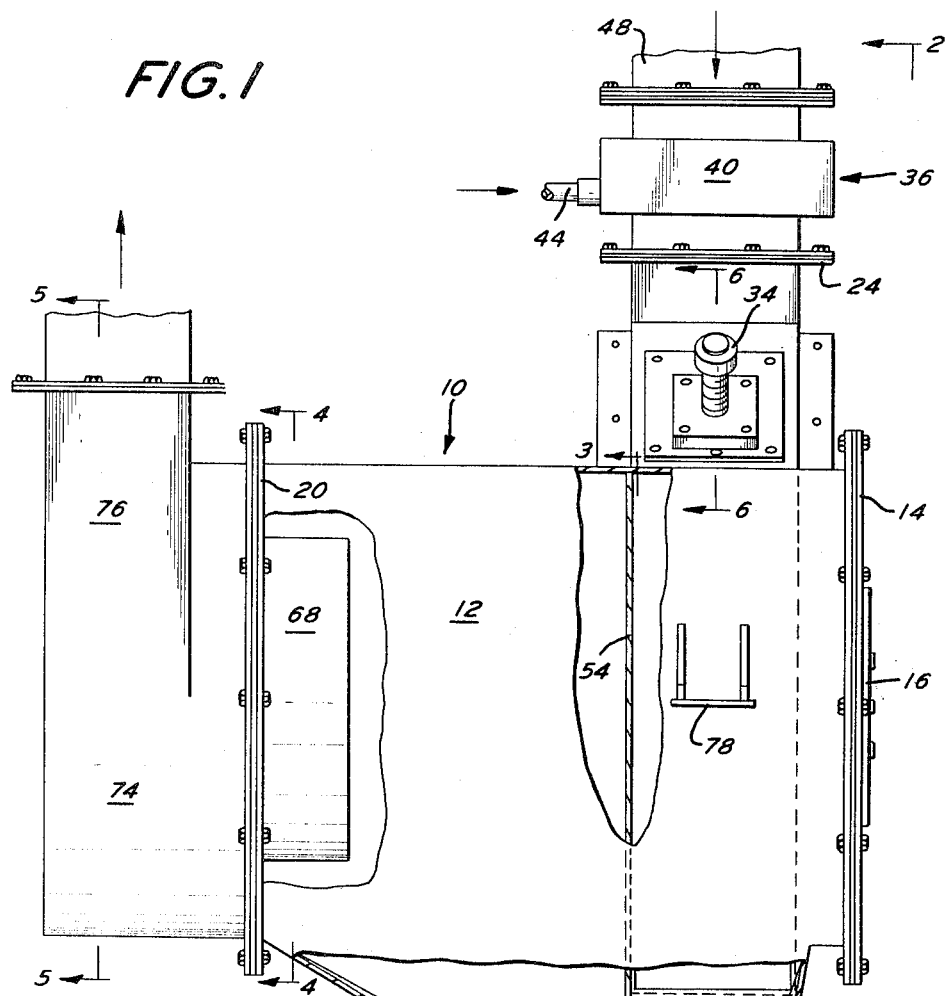
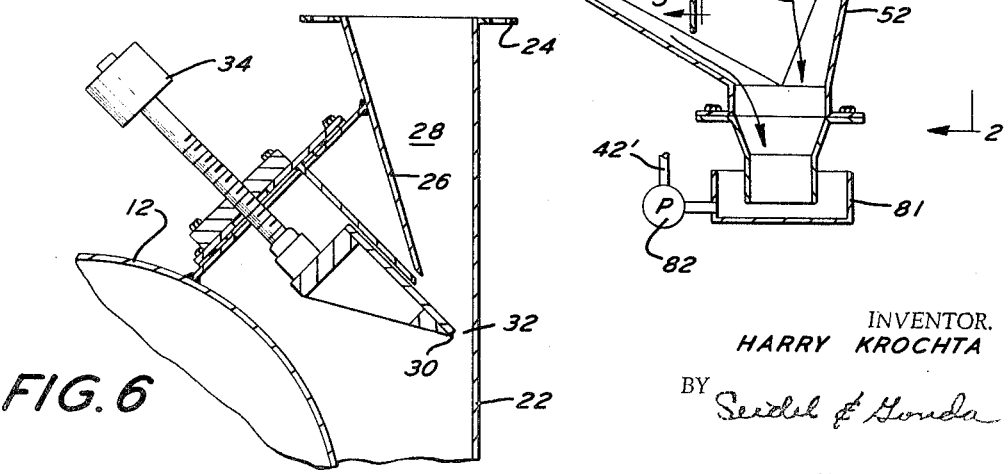
INVENTOR.
HARRY KROCHTA
BY Seidel & Gonda
ATTORNEYS.

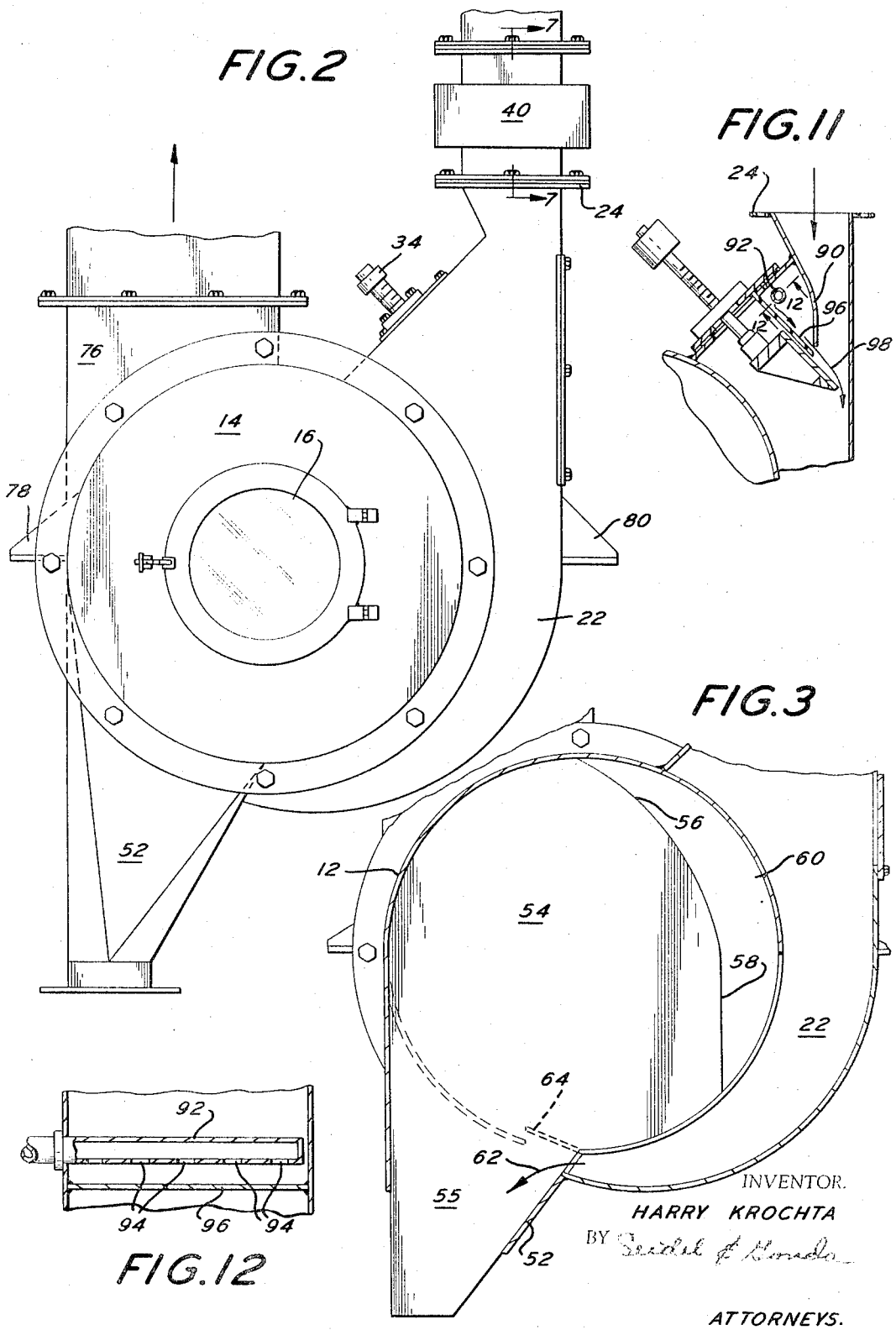

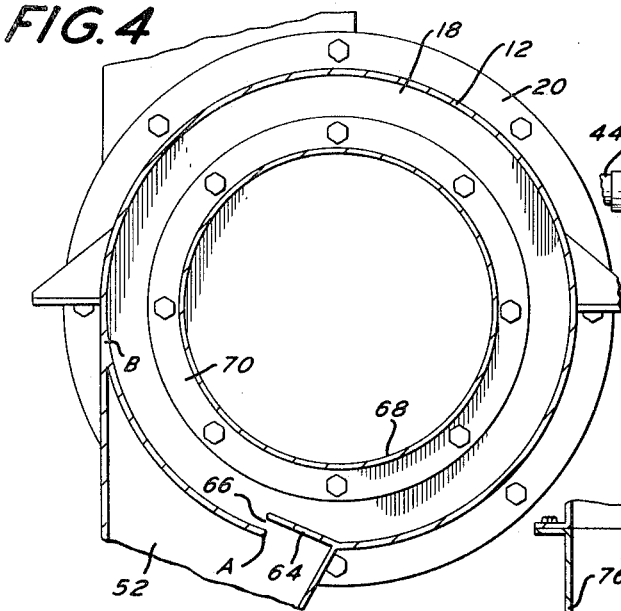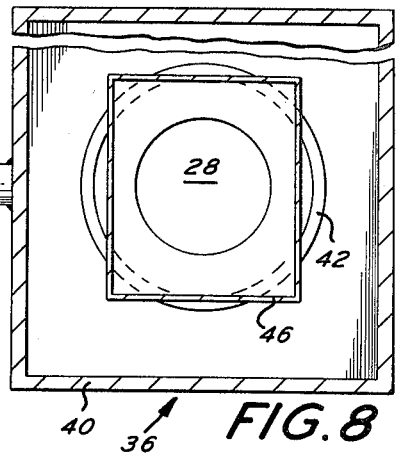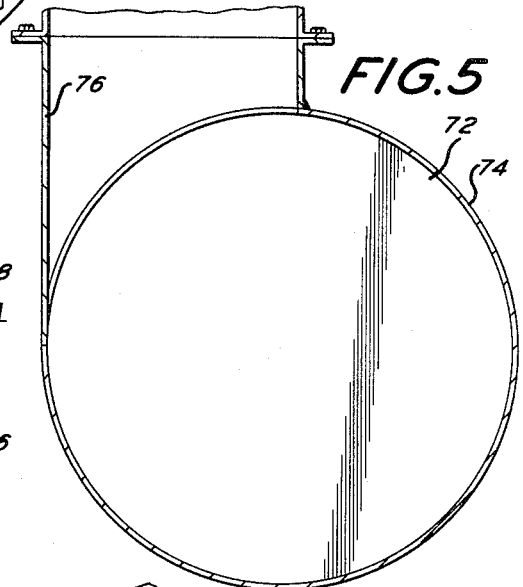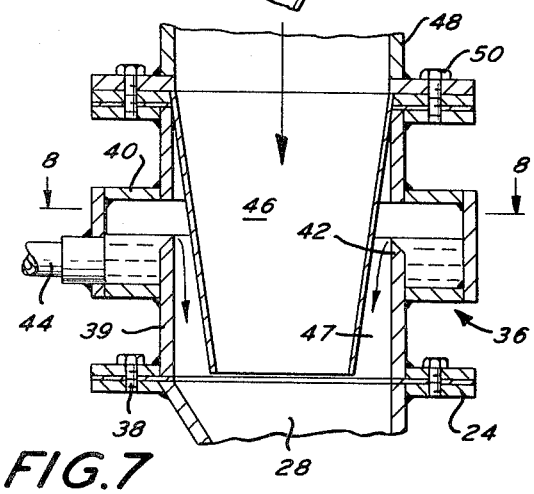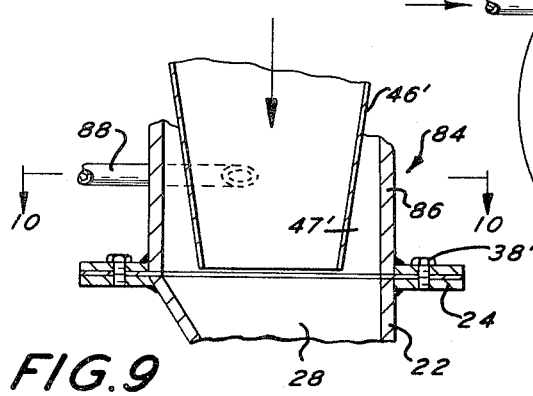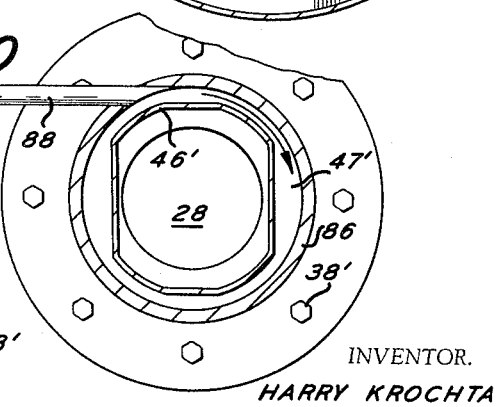

United States Patent Office 3,304,695
Patented Feb. 21, 1967

3,304,695
HORIZONTALLY DISPOSED CENTRIFUGAL
GAS SCRUBBER
Harry Krochta, East Northport, N.Y., assignor to The
Ducon Company, Inc., Mineola, N.Y., a corporation
of New York
Filed Mar. 29, 1965, Ser. No. 443,412
5 Claims. (Cl. 55—238)

This invention relates to a gas scrubber, and more particularly, to a highly efficient device by which extremely small size (including submicron) suspended particulate matter, such as liquid particles like acid mists and tar fogs, as well as solid particles such as dust may be removed from a gaseous fluid by agglomeration and centrifugal separation.

The use of centrifugal devices for removal of particulates suspended or entrained in gases such as air and the like is well known to the art. For example, see U.S. Patent 3,093,468.

The gas scrubber in the above-mentioned patent is of a vertical type and is efficient and practical within certain limits. Thus, it has now been found that for certain systems the efficiency of a centrifugal gas scrubber can be substantially increased when using a horizontally disposed centrifugal gas scrubber. As presently known, no one has ever proposed a horizontally disposed centrifugal gas scrubber heretofore. I have found that a horizontally disposed centrifugal gas scrubber is more versatile since it is capable of performing with high collection efficiencies over a wide range of pressure drops such as 5–50 inches water gauge or more and is capable of being adapted to solve problems which are external of the gas scrubber.

The gas scrubber of the present invention overcomes the wet-dry line problem, promotes even distribution of a liquid or slurry across the orifice for efficient atomization and agglomeration of particulates in the gas stream while avoiding plugging of the orifice. Further, the gas scrubber of the present invention can be utilized to substantially reduce the amount of liquid consumption since it is adapted for use in a closed cycle for the scrubbing liquid.

The horizontally disposed gas scrubber of the present invention is more efficiently and effectively adapted for use with low pressure drops by guaranteeing a complete curtain of scrubbing liquid at the orifice. In the devices proposed heretofore, there would be voids in the liquid curtain permitting dust to escape therethrough when they were operated at low pressure drops. Thus, the present invention can operate at relatively low pressure drops of about five to fifteen inches of water while obtaining the same equivalent efficiency of the gas scrubber in the above-mentioned patent operated at higher pressure drops.

It is an object of the present invention to provide a novel centrifugal gas scrubber which is horizontally disposed.

It is another object of the present invention to provide a versatile gas scrubber adapted to solving problems external of the gas scrubber.

It is another object of the present invention to provide a gas scrubber which may have a closed cycle for the scrubbing liquid.

It is another object of the present invention to provide a gas scrubber which introduces a scrubbing liquid into the orifice adjacent the tangential entrance into the gas scrubber housing by means of gravity while eliminating clogging of nozzles and the like.

It is another object of the present invention to provide a gas scrubber wherein the scrubbing liquid is introduced at the throat orifice by way of nozzles.

It is another object of the present invention to provide a horizontally disposed centrifugal gas scrubber which can operate effectively and efficiently at relatively low pressure drops on the order of about five to fifteen inches of water.

Other objects will appear hereinafter.

For the purpose of illustrating the invention, there are shown in the drawings forms which are presently preferred; it being understood, however, that this invention is not limited to the precise arrangements and instrumentalities shown.

FIGURE 1 is a front elevation view of the gas scrubber of the present invention.

FIGURE 2 is a side elevation view taken along the line 2—2 in FIGURE 1.

FIGURE 3 is a sectional view taken along the line 3—3 in FIGURE 1.

FIGURE 4 is a sectional view taken along the line 4—4 in FIGURE 1.

FIGURE 5 is a sectional view taken along the line 5—5 in FIGURE 1.

FIGURE 6 is a sectional view taken along the line 6—6 in FIGURE 1.

FIGURE 7 is a sectional view taken along the line 7—7 in FIGURE 2.

FIGURE 8 is a sectional view taken along the line 8—8 in FIGURE 7.

FIGURE 9 is a sectional view similar to FIGURE 7 but illustrating another embodiment of the means for introducing scrubbing liquid.

FIGURE 10 is a sectional view taken along the line 10—10 in FIGURE 9.

FIGURE 11 is a sectional view similar to FIGURE 6 but illustrating another embodiment of the means for introducing the scrubbing liquid.

FIGURE 12 is a sectional view taken along the line 12—12 in FIGURE 11.

Referring to the drawing in detail, wherein like numerals indicate like elements, there is shown in FIGURE 1 a front elevation view of a horizontally disposed centrifugal gas scrubber designated generally as 10.

The gas scrubber 10 includes a generally cylindrical housing 12 having its longitudinal axis horizontally disposed. The housing 12 has an end wall 14 at one end. Wall 14 may be provided with an observation window 16 if desired. The housing at its other end has a wall 18 terminating in a radially outwardly directed flange 20.

The housing 12 is provided with a tangential inlet portion 22 adjacent the wall 14, see FIGURES 1 and 3. The upper end of the inlet portion 22 terminates in an outwardly directed flange 24. A constriction wall 26 is provided adjacent the upper end of the inlet portion 22 as shown more clearly in FIGURE 6. A gas flow passage 28 is provided therein above a valve member 30. Valve member 30 is adjustably disposed for movement toward and away from the juxtaposed wall of portion 22 so as to define a variable orifice 32. Actuator means 34 is provided for valve member 30 and may be of the screw threaded type. Any suitable guide means may be provided for the valve member 30 so as to prevent rotation of the same when the actuator means 34 is rotated to adjust the size of the orifice 32. The orifice 32 is positioned as closely as possible to the tangential inlet into the housing 12. The reason for this is that the greatest velocity of the flowing medium is at the orifice 32. It has been found desirable for efficient operation to introduce the flowing medium into the housing 12 immediately after attaining its highest velocity. This is explained more fully in the above-mentioned patent, the disclosure of which is incorporated herein by reference.

A scrub liquid introduction means designated generally as 36 is removably coupled to the flange 24 by bolts 38. Means 36 includes a rectangular casing 39 having a rectangular housing 40 intermediate its ends. A portion of the casing 39 is extended upwardly into the housing 40 to define a weir 42. Scrub liquid is introduced into housing 40 by way of conduit 44. A conically-shaped baffle 46 is provided within the casing 39 and supported thereby in any convenient manner. The baffle 46 tapers toward the flange 24.

The space between the baffle 46 and inner surface of the casing 39 is identified by the numeral 47. A conduit 48, which carries the particle laden stream, has one end coupled to the upper end of casing 39 by bolts 50.

Referring to FIGURES 1 and 3, it will be noted that the housing 12 is provided with a conical base section 52 extending along substantially the entire length of the housing 12. A baffle 54 is provided within the housing 12 adjacent the inlet portion 22 and corresponding to the width thereof. That is, the inlet portion 22 has a width corresponding to the distance bteween wall 14 and baffle 54. Baffle 54 has an extension 55 which extends into the base section 52 as shown more clearly in FIGURES 1 and 3. The extension 55 of the baffle 54 may hereinafter be referred to as a baffle means.

The baffle 54 has an arcuate edge 56 and a straight line edge 58 which are spaced from the inner periphery of the housing 12 thereby defining a crescent-shaped opening 60. Opening 60 provides communication between the portions of the interior of housing 12 on opposite sides of the baffle 54.

As shown more clearly in FIGURE 4, the housing 12 between baffle 54 and end wall 18 is provided with a lip 64 bent inwardly so as to define a gap 66. Gap 66 provides communication between the interior of housing 12 between baffle 54 and end wall 18 on the one hand and the base section 52 on the other hand. The interior of housing 12 between baffle 54 and end wall 14 is directly in communication with the base section 52. Thus, within housing 12 between end wall 14 and baffle 54, there is no arcuate wall corresponding to the points A–B on the housing 12 in FIGURE 4.

As clearly seen in FIGURE 4 the gap 66 is defined by a first edge on lip 64 and a second edge adjacent and therebelow at point A.

Scrubbed gas may leave the housing 12 by way of outlet port 68 in a tube having a flange 70 bolted to the end wall 18. It will be noted that the cross-sectional area of outlet port 68 is substantially smaller than the cross-sectional area of housing 12 and that the outlet port 68 is concentrically arranged whereby moisture does not exit from the housing by way of port 68. The outlet port 68 communicates with a cylindrical drum 74 bolted to the flange 20. Drum 74 is provided with a tangentially disposed outlet conduit 76 and can be rotated 360° to suit the location in elevation of any connecting duct, exhaust fan, or other equipment. If desired, gas discharge could continue horizontally from port 68.

The housing 12 may be provided with mounting brackets 78 and 80 for supporting the same in a horizontal disposition. A surge tank 81 and pump 82 may be coupled to the outlet of base section 52. The outlet of pump 82 is designated as conduit 42'. Conduit 42' is adapted to communicate with conduit 44 so as to define a closed system for the scrubbing liquid. A closed system for the scrubbing liquid is desirable for cutting down on consumption of scrubbing liquid. In some systems, it is desirable to have a closed system for the scrubbing liquid for other purposes, namely applications in the chemical industry where the scrubbing liquid will be in the form of a solution or slurry whose concentration it is desirable to maintain at some specified level.

The operation of the gas scrubber 10 is as follows:

Gas with suspended particulates enters the gas scrubber 10 by way of conduit 48 and passage 28. In the passage 28, the gas is exposed to walls which have a scrubbing liquid thereon. That is, scrubbing liquid is introduced into the housing 40, overflows the weir 42, falls by gravity down the inner surface of casing 39 through space 47, and along the constriction wall 26 as well as the inner surface of the walls defining the inlet portion 22. Since the dirty gas is exposed to a moving film of scrubbing liquid, it cannot accumulate on the walls of the apparatus. Such accumulation would build up rapidly and would require the apparatus to be shut down frequently for cleaning purposes.

Atomization of the scrubbing liquid occurs at the orifice 32 by the high velocity gas stream which attains its maximum velocity at the orifice 32 the size of which is adjustably controlled by valve member 30 and its actuator means 34. Maximum agglomeration of the suspended particulates within the gas stream and the scrubbing liquid occurs in the region of maximum gas velocity, since such region also serves to effect maximum break-up of the scrubbing liquid. The method of scrubbing liquid introduction by gravity flow along the walls of the inlet portion 22 guarantees a complete curtain of scrubbing liquid at the orifice 32 thereby permitting operation of the scrubber at lower pressure drop levels (5–15" w.g.) than is feasible with the vertical type covered by the above-mentioned patent.

From the orifice 32, the high gas velocity stream carrying agglomerates of scrubbing liquid and suspended particulates move through the inlet portion 22 into the portion of the housing 12 between the baffle 54 and the end wall 14. The agglomerated scrubbing liquid and suspended particulates will be discharged immediately in a direction of arrow 62 (FIGURES 1 and 3) into the base section 52. The gas stream and suspended liquid particles will continue around the inner periphery of the housing 12 in a clockwise direction in FIGURE 3 until the same escapes through the crescent shaped opening 60 at a proper angle and velocity while following the periphery of housing 12 to the other side of the baffle 54. Between the end wall 18 and the baffle 54, the stream continues to follow the periphery of housing 12 in a clockwise direction while moving toward outlet port 68. In doing so, a film of liquid will accumulate on the inner surface of the housing 12 between the points A and B. Such film of liquid will escape through the gap 66 into the base section 52.

The clean gas will escape through the port 68 into the drum 74 and be discharged through outlet conduit 76. The liquid and agglomerated particles accumulated within base section 52 may be pumped by pump 82, via conduits 42' and 44 back into the housing 40.

In FIGURES 9 and 10, there is designated a scrubbing liquid introduction means 84 which may be substituted for means 36. Means 84 includes a cylindrical casing 86 which may be bolted to flange 24 by way of bolts 38'. Casing 86 may include a conical or funnel-shaped baffle 46' therewith so as to define a space 47' in the same manner as described above. Scrubbing liquid may be introduced into the space 47' by a conduit 88. Conduit 88 is tangentially disposed with respect to casing 86.

Scrubbing liquid introduced into the space 47' will follow the inner surface of casing 86 and descend due to gravity in the same manner as described above.

In FIGURES 11 and 12, there is illustrated another embodiment for introducing the scrubbing liquid. Thus, the scrubbing liquid may be introduced into chamber 90 by way of a pipe 92. Pipe 92 may be provided with a single opening or a plurality of outlet ports 94 whose total cross-sectional area is substantially equal to the cross-sectional area of pipe 92. Scrubbing liquid discharged through ports 94 impinges upon splash plate 96 and falls due to gravity in the direction of arrow 98.

The scrubbing liquid introduction means of FIGURES 11 and 12 may be utilized in place of the means 36 or means 84 in conjunction with the gas scrubber 10. Since there are no spray nozzles or constrictions in any of the scrubbing liquid introduction means described above, scrubbing liquids containing relatively high concentrations of suspended solids may be utilized without plugging difficulties.

The present invention, in part, recognizes that a horizontal centrifugal scrubber can discharge cleaned gases without any entrained liquids because of the relatively high gas velocities involved which impart centrifugal forces many times the force of gravity to the entrained particulates. In the pressure drop range of five to fifty inches of water, gas velocities of between about 8,000 ft./min. to 25,000 ft./min. are involved. Depending on the velocity and pressure drop, the centrifugal force may be between 200 and 1,000 times the force of gravity.

Hereinafter, the interior of the housing 12 between baffle 54 and wall 14 may be referred to as a first chamber. Hereinafter, the interior of housing 12 between baffle 54 and wall 18 may be referred to as a second chamber.

The present invention may be embodied in other specific forms without departing from the spirit or essential attributes thereof and, accordingly, reference should be made to the appended claims, rather than to the foregoing specification as indicating the scope of the invention.

It is claimed:

1. A gas scrubber for removing particulate from a gas stream comprising a generally cylindrical housing having its longitudinal axis substantially horizontally disposed, a baffle within said housing dividing said housing into first and second chambers, a vertical tangential inlet to said housing in communication with said first chamber, a base section below said housing for receiving liquid and particulate from said first and second chamber, baffle means extending into said base section to obstruct free communication between said chambers proximate said base section, said housing having an outlet port disposed along said axis and communicating with said second chamber, said first chamber including means for causing said gas to exit from said first chamber at a high velocity, port means providing communication between said chambers adjacent the outer periphery of said chambers and means for introducing a liquid into the scrubber for scrubbing the gas stream, said means for introducing a liquid being located proximate said tangential inlet, said port means including a generally crescent-shaped opening formed by the periphery of said baffle and the inner periphery of said housing, said opening being disposed generally opposite said base section.

2. A gas scrubber in accordance with claim 1 wherein said base section includes two separate chambers, and means providing liquid communication between the chambers of the base section at a location below and remote from the housing.

3. A gas scrubber in accordance with claim 1 wherein said outlet port is a tube of substantially smaller cross section than said housing and being coaxial with said axis.

4. A gas scrubber in accordance with claim 1 including means for causing the gas stream to atomize a scrub liquid while the gas stream is at its maximum velocity and entering said tangential inlet.

5. A gas scrubber in accordance with claim 1 wherein the lower portion of said second chamber adjacent said base section has a gap therein so that liquid may fall along the inner wall surface of said second chamber due to gravity into said base section, said gap being defined by first and second edges of said lower portion of said second chamber with the first edge being adjacent and above the second edge.

References Cited by the Examiner

UNITED STATES PATENTS

| 1,866,196 | 7/1932 | Criqui et al. | 55—235 X |
| 2,259,034 | 10/1941 | Fisher | 55—238 |
| 2,608,267 | 8/1952 | Ortgies | 55—238 X |
| 3,093,468 | 6/1963 | Krochta | 55—238 |
| 3,109,723 | 11/1963 | Haught | 55—238 X |
| 3,131,237 | 4/1964 | Collins | 55—257 X |
| 3,138,441 | 6/1964 | Krantz | 55—257 X |
| 3,218,047 | 11/1965 | Calaceto | 55—238 X |

ROBERT F. BURNETT, *Primary Examiner.*

D. K. DENENBURG, *Assistant Examiner.*